US006485630B1

United States Patent
Gangopadhyay et al.

(10) Patent No.: US 6,485,630 B1
(45) Date of Patent: Nov. 26, 2002

(54) METHOD OF REDUCING WEAR IN LUBRICATED METAL CUTTING OPERATION

(75) Inventors: Arup Kumar Gangopadhyay; Gary C. Barber, both of Novi; Han Zhao, Rochester, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 8 days.

(21) Appl. No.: 09/630,470

(22) Filed: Aug. 2, 2000

(51) Int. Cl.[7] .............................. B23H 3/00; B23H 5/00; B23H 7/30
(52) U.S. Cl. ...................... 205/640; 205/674; 205/682; 205/684; 205/686; 219/69.17; 219/69.2
(58) Field of Search ................................. 205/640, 674, 205/684, 682; 219/69.17, 69.2

(56) References Cited

U.S. PATENT DOCUMENTS

| | | | |
|---|---|---|---|
| 3,459,645 A | | 8/1969 | Wilson et al. |
| 3,672,963 A | * | 6/1972 | De Palma et al. ........... 205/211 |
| 3,852,176 A | * | 12/1974 | Rosenthal .................... 205/662 |
| 3,873,512 A | * | 3/1975 | Latanision ................... 205/643 |
| 4,013,526 A | | 3/1977 | Inoue |
| 4,405,411 A | * | 9/1983 | Inoue et al. ................... 205/93 |
| 4,714,529 A | | 12/1987 | Wang et al. |
| 5,666,839 A | | 9/1997 | Su et al. |
| 5,685,971 A | | 11/1997 | Schroder et al. |
| 5,820,744 A | | 10/1998 | Edwards et al. |
| 5,976,347 A | | 11/1999 | Wakabayashi et al. |

FOREIGN PATENT DOCUMENTS

| | | |
|---|---|---|
| DD | 114284 A | 5/1973 |
| EP | 0 640 438 A1 | 3/1995 |
| GB | 1 309 949 | 3/1973 |
| GB | 2 203 084 A | 10/1988 |

OTHER PUBLICATIONS

J. Ellis, G. Barrow, "Tool Wear In Metal Cutting and Its Relationship With The Therm–Electric Circuit", Annals of CIRP, 1969, vol. 17, Pergamon Press (No Month).
H. G. Prengel, W.R. Pfouts, A.T. Santhanam, "State of the Art In Hard Coatings For Carbide Cutting Tools", Surface and Coatings Technology, 1998 (No Month).

* cited by examiner

Primary Examiner—Donald R. Valentine
(74) Attorney, Agent, or Firm—Damian Porcari

(57) ABSTRACT

A method of reducing cutting tool wear in a lubricated metal cutting operation has been developed. An electrical cutting cell is provided having an anodic conductive cutting tool and a cathodic conductive work-piece connected to a DC current supply; the lubricant contains platable wear reducing agents. The lubricant is located to bathe the contacting interface between the cutting tool and work-piece to constitute an electrolyte. Next, the electrical current flow through the contacting interface is controlled to be in the range of 25–500 milli-amps. Lastly, the cutting tool is moved into and along cutting contact with the work-piece while current flows there-between to electro-chemically deposit the wear reducing agents on at least the contacting interface to reduce cutting tool wear and improve ease of mass removal.

8 Claims, 3 Drawing Sheets

METHOD OF REDUCING WEAR IN LUBRICATED METAL CUTTING OPERATION

BACKGROUND OF THE INVENTION

1. Technical Field

This invention relates to the technology of metal cutting and more particularly to reduction of cutting tool wear and vibration in a lubricated metal cutting operation using conventional cutting tool materials.

2. Discussion of the Prior Art

Manufacturing industries, particularly the automotive industry, utilize a significant amount of machining, including turning, drilling, tapping, etc., of aluminum, cast-iron, and steel to fabricate parts, such as cylinder heads, engine blocks, camshafts etc. These machining operations are performed generally using high-speed tool steel or tungsten carbide tools. These tools need to be replaced periodically for wear to maintain dimensional tolerance of parts and also to keep machine vibration under control; such removal results in machine downtime. Therefore, an improvement in tool life would mean less frequent tool replacement resulting in cost savings and reduced machine downtime.

During the past several years some improvement in tool life has been realized through use of more wear resistant materials, such as ceramics or vapor deposited hard coatings, but with higher costs. The present invention provides an alternate route to improve tool life by passing a small direct current through the tool/work-piece interface accompanied by a very little increase in cost but a significant increase in tool wear life. Investigations of the effectiveness of electrical currents, relative to wear elements, have been carried out in a limited capacity by the prior art. In 1969, Ellis and Barrow reported investigating thermally induced electromotive forces in an un-lubricated cutting operation; the electromotive force was augmented with an external circuit (see Annals of CIRP, Vol. XVII, page 39, 1969). The investigators could not confirm a reduction in wear. In 1987 an electrical current was employed to reduce friction in a lubricated bearing contact (i.e. piston and cylinder) by precipitating iron phosphate film from the lubricant (see U.S. Pat. 4,714,529). In 1997, in a wire drawing operation, a DC current was passed between a lubricated capstan sleeve and a copper wire prior to entering a drawing die; water in the lubricant was disassociated to form hydrogen gas which disrupted oxide film formation which allowed easier plastic deformation of pure copper and lower friction in the die (see U.S. Pat. 5,666,839).

None of these prior art approaches teach how to significantly reduce wear in a lubricated metal cutting operation by a reliable and economical technique.

SUMMARY OF THE INVENTION

An object of this invention is to provide a method and apparatus that forms an anodic deposit on the tool cutting surface during a lubricated cutting operation, which increases the wear life of the tool and significantly delays the onset of vibration.

The invention, in a first aspect, that meets the above object, is a method of reducing wear in a lubricated metal cutting operation, comprising: (a) providing an electrical cutting cell having an anodic conductive cutting tool and a cathodic conductive work-piece connected to a DC current supply, the lubricant containing platable wear reducing agents and arranged to bathe the contacting interface between the cutting tool and work-piece to function as an electrolyte; (b) controlling the electrical current flow through the contacting interface to be in the range of 25–500 milli-amps; and (c) moving the cutting tool into and along cutting contact with the work-piece while current flows there-between to electro-chemically deposit the wear reducing agents on at least the contacting interface for reducing cutting tool wear and improving ease of mass removal from the workpiece.

DETAILED DESCRIPTION AND BEST MODE

Figure 1:
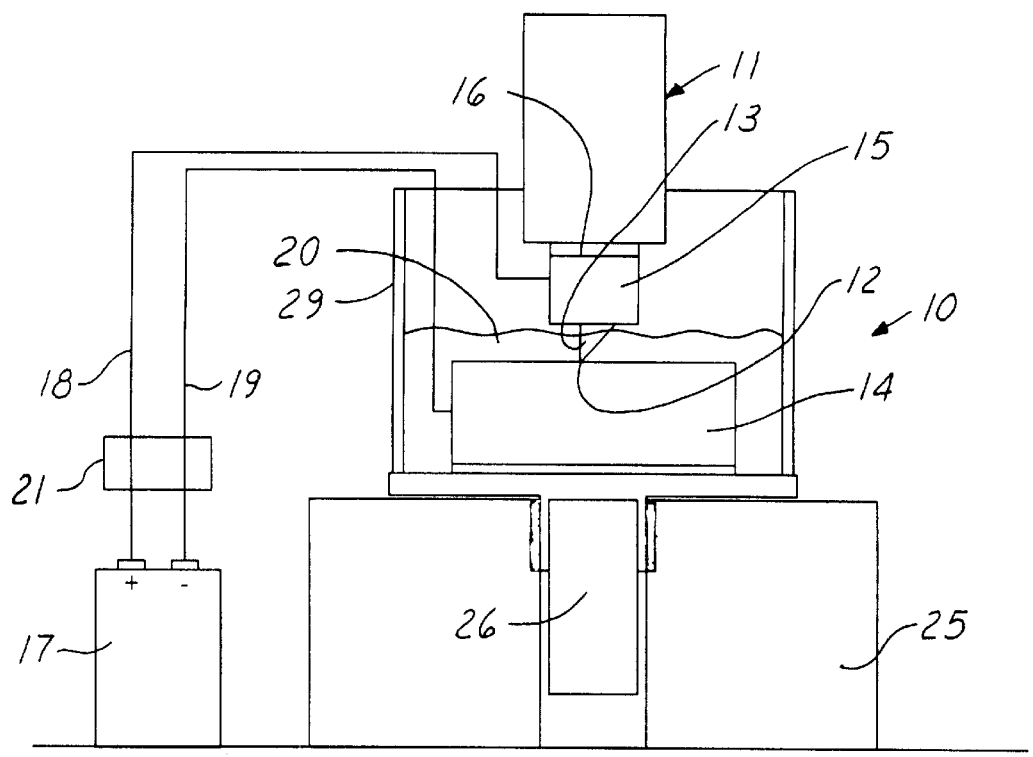
FIG. 1 is a schematic elevational illustration of an electrochemical cutting cell as used in this invention.
Figure 4:
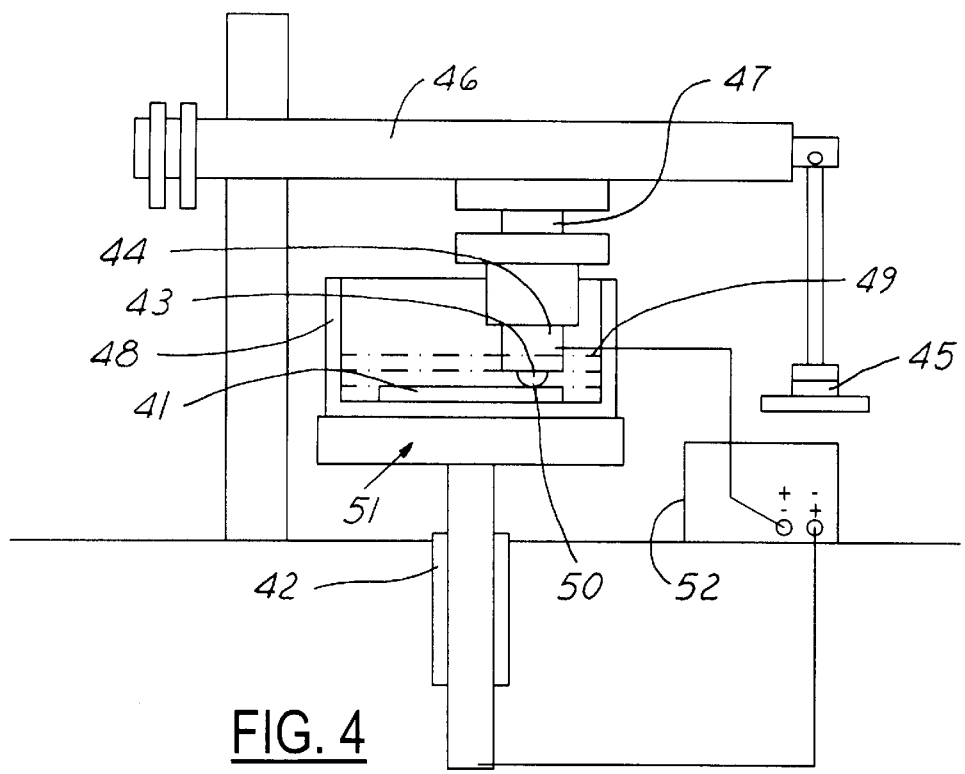
FIG. 4 is a schematic elevational illustration of apparatus used to quantify wear rate characteristics of a ball abrading against a disk while using the electro-chemical cell of this invention.

A lubricated electrochemical cutting cell 10 must be established within a machining apparatus 11 (see FIG. 1), which, if conventional apparatus, should be slightly modified to create a flow for the electrical current through the lubricated cutting interface 12 between at least a portion of conductive cutting tool 13 and a conductive work-piece 14 (undergoing cutting). The work-piece can be supported as fixed or rotatable on a table 25 by way of a trunion 26. Such slight modifications usually involve electrically insulating the cutting tool holder 15 and the workpiece from the rest of the machining apparatus 11; this may be accomplished by inserting a non-conductive ply of material 16, i.e. rubber, at the appropriate locations. Any ball bearing connection 42 (see FIG. 4) can also serve as such electrical insulation since the bearing contact area is so small and thus little current is leaked.

The electro-chemical cell 10 has a source of DC current, such as from a separate battery 17 (although the power source can be built into the machining apparatus), and leads 18, 19 connecting the cutting tool as an anode and the work-piece as a cathode so that DC current will flow through a lubricant (electrolyte 20) that bathes the interface cutting contact 12. DC current flow through the cell is regulated in a controlled range of 25–500 milliamps by voltage regulator 21 of the power supply. The electrolyte can be a machining lubricant emulsion comprised of about 90% water and 10% oil constituent, with the oil having metal working additives that will plate out as wear reducing elements. It is desirable that the oil constituent contain one or more of zinc, calcium, sodium, sulfur, and phosphorus.

Figure 2:
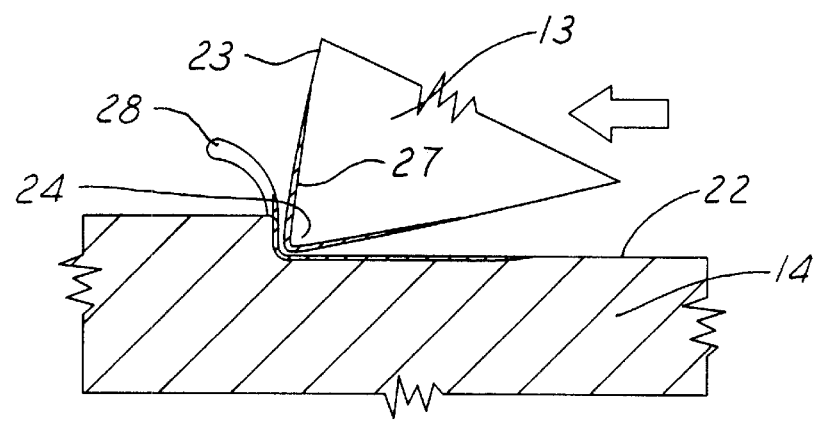
FIG. 2 is an enlarged view of the anodic cutting tool as it removes material from a work-piece while being used in the electrochemical cell.

When cutting is initiated by relative movement between the cutting tool and work-piece (see FIG. 2), a cut wear track or surface 22 is created, which is dependent on feed rate, depth of cut setting, etc., of the machining apparatus. However, by use of the electro-chemical cell herein, wear on the flank surface 24 or rake surface 23 of the tool will be less and the onset of vibration characteristics, over extended tool use, is postponed to a much later stage.

It is theorized that the cell, in a controlled milli-amp range, induces continuous thin deposits of wear reducing agents from the lubricated emulsion (acting as the electrolyte), such as one or more of zinc, calcium, sodium, or oxides of phosphorus, sulfur and work-piece metal. The plated film 27 is greater on the anode, although such plating occurs on both the anode and cathode surfaces exposed to the electrolyte. Such film becomes sacrificial, in the wear phenomenon taking place during cutting, where the tool tip engages the work-piece and cutting chip 28. The anodic deposit has a film thickness which is usually about 50–150 nanometers.

Figure 3:
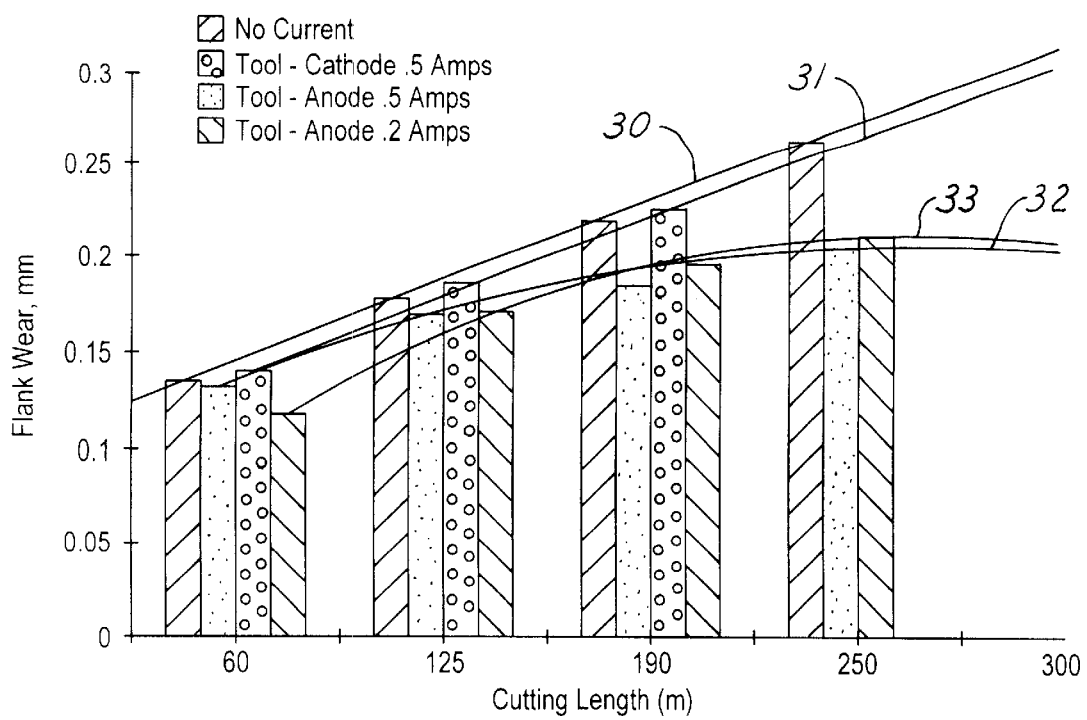
FIG. 3 is a graphical illustration showing cutting tool flank wear as a function of cutting length, with and without the use of the invention herein.

FIG. 3 shows flank wear measurements on a cutting tool as a function of cutting length (track length) for different cell arrangements. A carbide tool insert was used for milling cold rolled steel at 1200 r. p.m. with 0.15 mm depth of cut and 0.125 mm/rev. of feed. Plot 30 shows wear, when no external current is passed through the lubricated interface, and plot 31 shows wear when the tool is connected as a cathode at 500 milliamps; such plots demonstrate rapidly increasing flank wear, which is undesirable. It is expected that the trend of these plots can be projected over an even greater cutting length, which will show even greater increases in wear. In contrast, when the cutting tool is connected as the anode in the cell and experiences a current of 200–500 milliamps, flank wear rises at a slower rate. Plot 32, at 500 milli-amps, indicates flank wear will be reduced the most, as compared to no applied current, at longer cutting lengths (a 22% percent reduction in wear); plot 33 shows flank wear will be reduced the lowest at shorter cutting lengths of 60–125 meters. Similar results could be obtained in drilling and turning operations with very little modifications to the tool holder.

Figure 5:
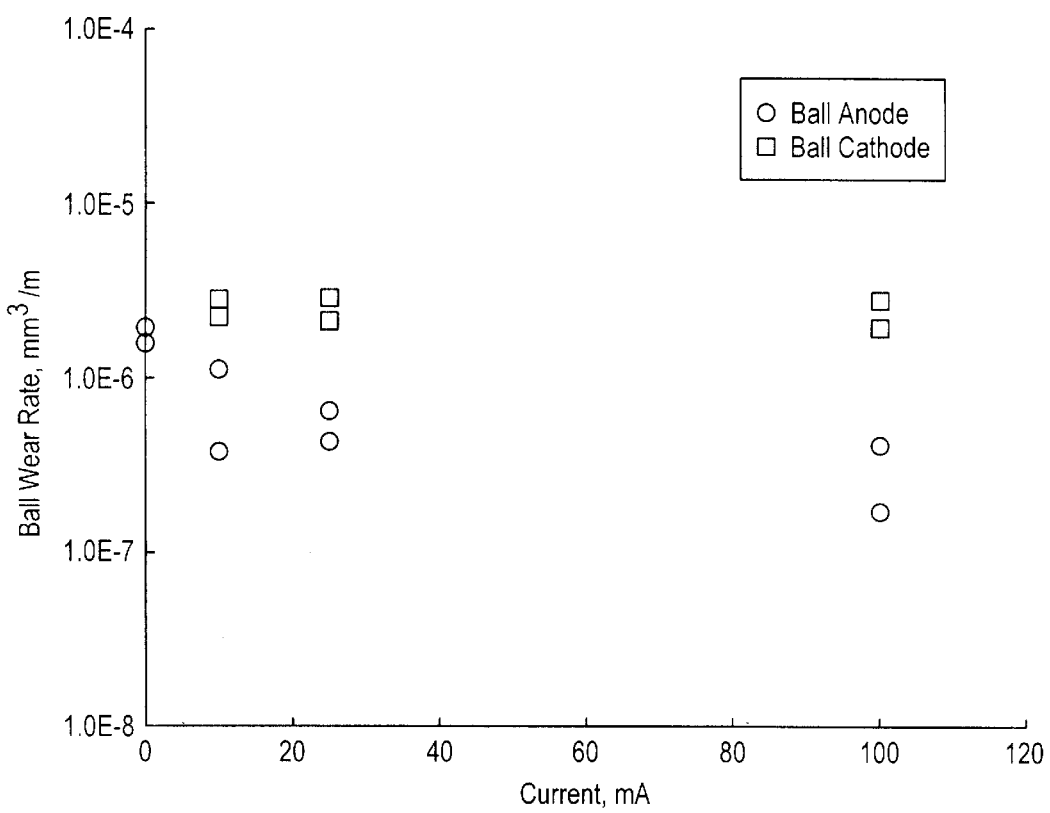
FIG. 5 is a graphical illustration of ball wear rates as a function of different milli-currents through the electro-chemical abrading cell of FIG. 4.

To further corroborate the reduction in tool wear as a result of the use of the electro-chemical cell, a ball on disk test was undertaken. The apparatus, shown in FIG. 4, employs a rotating disk 41 (made of 4340 hardened steel supported by a driven table 51 assembled with a bearing 42) which simulates a workpiece to be machined, and a hard 52100 steel ball 43 (¼ inch in diameter held in a ball holder 44) which simulates a cutting tool. The ball was pressed against the rotating disk (spinning at about 72 r.p.m.) with an initial contact stress of about 0.7 GPa through the application of deadweights 45 hanging from the end of arm 46 supporting the ball holder 44 (deadweights weighed about 4.4 newtons or one pound). The cell was arranged to connect the ball as an anode, or as a cathode, with the power supply 52; the ball was insulated from the rest of the apparatus by a plexiglass plate 47. A similar reservoir 48 was used to contain the lubricant 49 above the ball-disk interface 50. The cell was operated with varying currents from 5–2950 milliamps; the lubricant was a conventional motor oil (5W30) at room temperature or 100° C. Ball wear was calculated by measuring the wear scar diameter (ball track) at the end of the test. FIG. 5 shows the effect of current on ball wear and also shows the effect of polarity. Ball wear rate is decreased by about 80% (relative to no current) with a 100 milliamp current when the ball is the anode; the ball wear decrease is similar at a current of 25 milliamps, but the ball wear decrease is not as much at the 10 milliamp level. When the ball is connected as a cathode, the wear rate is equal to or greater than no current.

Figure 6:
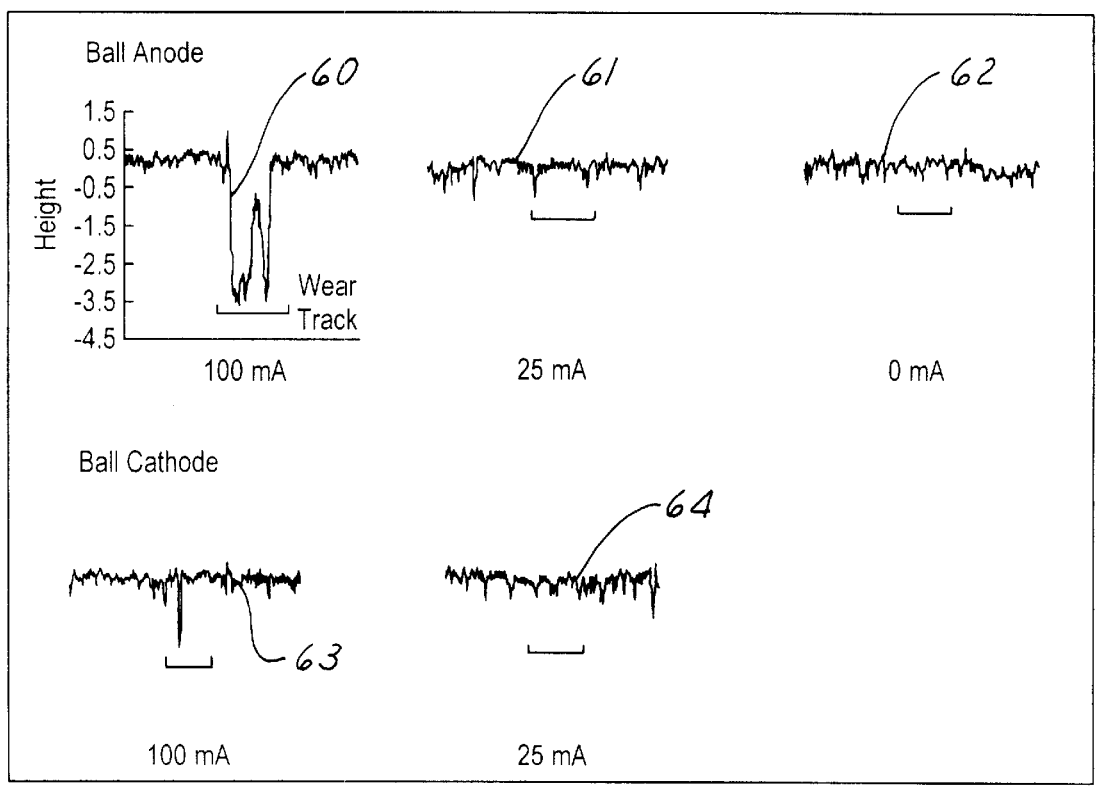
FIG. 6 is a graphical illustration showing mass removal (profilometer height) for different milli-currents through the electro-chemical abrading cell of FIG. 4.

A profilometer was used to measure the wear track created by the ball as a result of being pressed against the disk (see FIG. 6); this measurement is an indication of the amount of mass removal from the work-piece as affected by the use of this invention. When the ball is connected as the anode, a very clear indication of significant mass removal is indicated at 100 milliamps (plot 60) and somewhat less at 25 milliamps (plot 61), but both exhibit greater mass removal than when no current is used (plot 62). When the ball is connected as a cathode, the profilometer shows comparatively less mass removal at each of 100 milliamps (plot 63) and 25 milliamps (plot 64).

While the best mode and viable alternatives for carrying out the invention have been described in detail, those familiar with the art to which this invention relates will recognize various alternative designs and variations for practicing the invention as defined by the following claims.

What is claimed is:

1. A method of reducing wear in a lubricated metal cutting operation, comprising: (a) providing an electrical cutting cell having an anodic conductive cutting tool and a cathodic conductive work-piece connected to a DC current supply, and a lubricant containing platable wear reducing agents and arranged to bathe the contacting interface between the cutting tool and work-piece to function as an electrolyte; (b) controlling the electrical current flow through the contacting interface to be in the range of 25–500 milli-amps; and (c) moving the cutting tool into and along cutting contact with the work-piece while current flows there-between to electro-chemically deposit the wear reducing agents on at least the contacting interface for reducing cutting tool wear and improving the ease of mass removal.

2. The method as can claim 1, in which said cutting tool is comprised of either tool steel or tungsten carbide, and said workpiece is comprised of aluminum or ferrous material, and said current is in the range of 25–100 milliamps.

3. A method of reducing wear in a lubricated metal cutting operation, comprising: (a) providing an electrical cutting cell having an anodic conductive cutting tool and a cathodic conductive work-piece connected to a DC current supply, and a lubricant containing platable wear reducing agents and arranged to bathe the contacting interface between the cutting tool and work-piece to function as an electrolyte; (b) controlling the electrical current flow through the contacting interface to be in the range of 25–500 milli-amps; and (c) moving the cutting tool into and along cutting contact with the work-piece while current flows there-between to electro-chemically deposit the wear reducing agents on at least the contacting interface for reducing cutting tool wear and improving the ease of mass removal, wherein said electrolyte is comprised of a water and oil emulsion, the oil containing one or more aware reducing agents selected from the group consisting of zinc, calcium, sodium, phosphorus and sulfur.

4. A method of reducing wear in a lubricated metal cutting operation, comprising: (a) providing an electrical cutting cell having an anodic conductive cutting tool and a cathodic conductive work-piece connected to a DC current supply, and a lubricant containing platable wear reducing agents and arranged to bathe the contacting interface between the cutting tool and work-piece to function as an electrolyte; (b) controlling the electrical current flow through the contacting interface to be in the range of 25–500 milli-amps; and (c) moving the cutting tool into and along cutting contact with the work-piece while current flows there-between to electro-chemically deposit-the wear reducing agents on at least the contacting interface for reducing cutting tool wear and improving the ease of mass removal, wherein said lubricant is comprised, by volume, of about 90% water and about 10% oil, with said oil holding said where, reducing agents in solution.

5. The method as in claim 4, in which said wear reducing agents constitute, by weight, about 15% of said oil and about 1–2% of the lubricant.

6. A method of reducing wear in a lubricated metal cutting operation, comprising: (a) providing an electrical cutting cell having an anodic conductive cutting tool and a cathodic conductive work-piece connected to a DC current supply, and a lubricant containing platable wear reducing agents and arranged to bathe the contacting interface between the cutting tool and work-piece to function as an electrolyte; (b) controlling the electrical current flow through the contacting interface to be in the range of 25–500 milli-amps; and (c) moving the cutting tool into and along cutting contact with the work-piece while current flows there-between to electro-chemically deposit the wear reducing agents on at least the contacting interface for reducing cutting tool wear and improving the ease of mass removal, wherein the anodic deposit on the cutting tool comprises a thin plated film having one or more of the zinc, calcium or sodium elements, and/or one or more oxides of the work-piece metal, phosphorus and sulfur.

7. A method of reducing wear in a lubricated metal cutting operation, comprising: (a) providing an electrical cutting cell having an anodic conductive cutting tool and a cathodic conductive work-piece connected to a DC current supply, wherein the cutting tool is comprised of either tool steel or tungsten carbide and the workpiece is comprised of aluminum or ferrous material, and a lubricant containing platable wear reducing agents and arranged to bathe the contacting interface between the cutting tool and work-piece to function as an electrolyte; (b) controlling the electrical current flow through the contacting interface to be in the range of 25–100 milli-amps; and (c) moving the cutting tool into and along cutting contact with the work-piece while current flows there-between to electro-chemically deposit the wear reducing agents on at least the contacting interface for reducing cutting tool wear and improving the ease of mass removal, wherein the electro-chemical deposit is in the thickness range of 50–150 nanometers.

8. A method of reducing wear in a lubricated metal cutting operation, comprising: (a) providing an electrical cutting cell having an anodic conductive cutting tool and a cathodic conductive work-piece connected to a DC current supply, and a lubricant containing platable wear reducing agents and arranged to bathe the contacting interface between the cutting tool and work-piece to function as an electrolyte; (b) controlling the electrical current flow through the contacting interface to be in the range of 25–500 milli-amps; and (c) moving the cutting tool into and along cutting contact with the work-piece while current flows there-between to electro-chemically deposit the wear reducing agents on at least the contacting interface for reducing cutting tool wear and improving the ease of mass removal, wherein said improvement in the ease of mass removal is characterized by a delay in the initiation of vibration resulting from tool wear reaching an initial amount.

* * * * *